US011734771B2

(12) United States Patent
Dutt et al.

(10) Patent No.: US 11,734,771 B2
(45) Date of Patent: Aug. 22, 2023

(54) SYSTEM AND METHOD FOR DETECTING AND MAPPING DATA FIELDS FOR FORMS IN A FINANCIAL MANAGEMENT SYSTEM

(71) Applicant: Intuit Inc., Mountain View, CA (US)

(72) Inventors: Bala Dutt, Bangalore (IN); Rahul Vankudothu, Kommala (IN); Prabhat Hegde, Bangalore (IN); Anurag Tyagi, Bangalore (IN); Sunil Tandra Sishtla, Bangalore (IN); Sandeep Gupta, Bangalore (IN)

(73) Assignee: Intuit Inc., Mountain View, CA (US)

( * ) Notice: Subject to any disclaimer, the term of this patent is extended or adjusted under 35 U.S.C. 154(b) by 59 days.

(21) Appl. No.: 17/398,284

(22) Filed: Aug. 10, 2021

(65) Prior Publication Data

US 2022/0005127 A1     Jan. 6, 2022

Related U.S. Application Data

(63) Continuation of application No. 15/857,134, filed on Dec. 28, 2017, now Pat. No. 11,120,512, which is a
(Continued)

(51) Int. Cl.
*G06Q 40/12*     (2023.01)
*G06F 40/174*    (2020.01)
*G06F 40/186*    (2020.01)

(52) U.S. Cl.
CPC ........... *G06Q 40/12* (2013.12); *G06F 40/174* (2020.01); *G06F 40/186* (2020.01)

(58) Field of Classification Search
CPC ...... G06Q 40/12; G06F 40/186; G06F 40/174
(Continued)

(56) References Cited

U.S. PATENT DOCUMENTS 6,460,042 B1   10/2002   Hitchcock et al.
7,139,757 B1   11/2006   Apollonsky
(Continued)

FOREIGN PATENT DOCUMENTS

WO     0106416 A2     1/2001

OTHER PUBLICATIONS

Ma et al., "Extracting unstrustured Data from Template Generated Web Documents", CLKM Nov. 3-8 (Year: 2003).*
(Continued)

*Primary Examiner* — Frantzy Poinvil
(74) *Attorney, Agent, or Firm* — Paradice & Li LLP

(57)     ABSTRACT

Systems and methods for generating a custom document template are disclosed. An example method may be performed by one or more processors of a system and include retrieving a user document including a user data entry in a user data field, identifying a set of system data fields within a plurality of system documents potentially relevant to the user document, determining, for each of the set of system data fields, a weighted value indicative of a likelihood that the system data field is relevant to the user data field, identifying a most relevant system data field of the set of system data fields, the most relevant system data field having a highest weighted value of the determined weighted values, and generating a custom document template including a dynamic data region for the user data entry, the dynamic data region mapped to the most relevant system data field.

20 Claims, 10 Drawing Sheets

Related U.S. Application Data continuation-in-part of application No. 14/697,803, filed on Apr. 28, 2015, now Pat. No. 9,934,213, and a continuation-in-part of application No. 14/590,286, filed on Jan. 6, 2015, now abandoned.

(58) Field of Classification Search
USPC .................................................. 705/3–44
See application file for complete search history.

(56) References Cited

U.S. PATENT DOCUMENTS

| | | | |
|---|---|---|---|
| 7,653,622 B2 | 1/2010 | Huentelman et al. | |
| 7,813,989 B2 | 10/2010 | Jones et al. | |
| 7,966,561 B1* | 6/2011 | Nguyen | G06Q 40/00 715/224 |
| 8,204,805 B2 | 6/2012 | Eftekhari et al. | |
| 8,572,083 B1 | 10/2013 | Snell et al. | |
| 8,706,762 B1 | 4/2014 | Patzer et al. | |
| 8,731,973 B2 | 5/2014 | Anderson et al. | |
| 8,775,416 B2 | 7/2014 | Heck | |
| 8,924,236 B2 | 12/2014 | Marchosky | |
| 9,542,710 B1 | 1/2017 | Izrailevsky et al. | |
| 9,934,213 B1 | 4/2018 | Dutt et al. | |
| 10,423,826 B2* | 9/2019 | Nepomniachtchi | G06V 30/40 |
| 10,762,581 B1 | 9/2020 | Dutt et al. | |
| 11,120,512 B1 | 9/2021 | Dutt et al. | |
| 11,295,396 B1* | 4/2022 | McDonald | G06V 30/412 |
| 2002/0174196 A1 | 11/2002 | Donohoe et al. | |
| 2003/0188260 A1 | 10/2003 | Jensen et al. | |
| 2004/0254953 A1 | 12/2004 | Todd, III | |
| 2006/0007189 A1 | 1/2006 | Gaines et al. | |
| 2007/0073519 A1 | 3/2007 | Long | |
| 2007/0168382 A1 | 7/2007 | Tillberg et al. | |
| 2008/0086352 A1 | 4/2008 | Hibbert et al. | |
| 2008/0144881 A1* | 6/2008 | Fortune | G06V 30/274 382/100 |
| 2008/0154824 A1 | 6/2008 | Weir et al. | |
| 2008/0235319 A1 | 9/2008 | Zargham et al. | |
| 2008/0263006 A1* | 10/2008 | Wolber | G06F 16/2471 |
| 2009/0074303 A1 | 3/2009 | Filimonova et al. | |
| 2009/0144157 A1 | 6/2009 | Saracino et al. | |
| 2010/0179860 A1 | 7/2010 | Noel et al. | |
| 2011/0066585 A1 | 3/2011 | Subrahmanyam et al. | |
| 2011/0179036 A1 | 7/2011 | French et al. | |
| 2011/0184863 A1 | 7/2011 | Coleman et al. | |
| 2011/0222776 A1 | 9/2011 | Jiang et al. | |
| 2011/0252313 A1 | 10/2011 | Tanushree et al. | |
| 2011/0276493 A1 | 11/2011 | Graham, III et al. | |
| 2012/0123996 A1 | 5/2012 | Krinsky | |
| 2012/0150888 A1 | 6/2012 | Hyatt et al. | |
| 2013/0318426 A1 | 11/2013 | Shu et al. | |
| 2014/0108456 A1 | 4/2014 | Ramachandrula et al. | |
| 2014/0123057 A1* | 5/2014 | Eigner | G06F 21/60 715/780 |
| 2014/0195891 A1 | 7/2014 | Venkata Radha Krishna Rao et al. | |
| 2014/0207631 A1 | 7/2014 | Fisher | |
| 2014/0279303 A1* | 9/2014 | van Dam | G06Q 40/12 705/30 |
| 2015/0046224 A1 | 2/2015 | Adjaoute | |
| 2016/0379186 A1 | 12/2016 | Smith et al. | |
| 2017/0147540 A1* | 5/2017 | McCormick | G06F 40/194 |
| 2017/0236212 A1* | 8/2017 | Purville | G06Q 40/12 705/30 |
| 2018/0101760 A1 | 4/2018 | Nelson et al. | |
| 2018/0205546 A1* | 7/2018 | Haque | H04L 9/3213 |
| 2019/0026577 A1* | 1/2019 | Hall | G06V 30/1444 |
| 2019/0129931 A1 | 5/2019 | Hegde et al. | |
| 2021/0056259 A1 | 2/2021 | Hegde et al. | |
| 2022/0180113 A1* | 6/2022 | Patel | G06V 10/225 |

OTHER PUBLICATIONS

Pacific Coast Bankers' Bank Joins Bankers Bank Network of NetPrecision Internet Home Banking Resellers, Business Editors, Business Wire, New York, 4-pages, Feb. 16, 1999.

* cited by examiner

| 301 | 302 | 303 |
|---|---|---|
| singleDot | /duedate | 0.001 |
| singleDot | /companyname | 0.6 |
| singleDot | /title | 0.01 |
| singleDot | /companytin | 0.01 |
| singleDot | /businessnumber | 0.01 |
| singleDot | /companyemail | 0.7 |
| singleDot | /companyphone | 0.4 |
| singleDot | /companywebsite | 0.01 |
| singleDot | /companylogo | 0.5 |
| singleDot | /companyaddress | 0.5 |
| singleDot | /terms | 0.5 |
| singleDot | /message | 0.6 |
| singleDot | /companyinfo | 0.5 |
| singleDot | /dueamountinwords | 0.001 |
| singleDot | /amountdue | 0.7 |
| singleDot | /accepteddate | 0.001 |
| singleDot | /servicedate | 0.001 |
| singleDot | /accountsummarydate | 0.001 |
| singleDot | /shipdate | 0.001 |
| singleDot | /date | 0.001 |
| singleDot | /acceptedby | 0.5 |
| singleDot | /item | 0.5 |
| singleDot | /shipvia | 0.5 |

| 301 | 302 | 303 |
|---|---|---|
| singleDot | /trackingno | 0.001 |
| singleDot | /refnumber | 0.001 |
| singleDot | /billingtaxnumber | 0.001 |
| singleDot | /shippingaddress | 0.5 |
| singleDot | /billingaddress | 0.5 |
| singleDot | /itemdescription | 0.5 |
| singleDot | /accountsummarydescription | 0.5 |
| singleDot | /qty | 0.001 |
| singleDot | /sno | 0.001 |
| singleDot | /taxrate | 0.7 |
| singleDot | /deposit | 0.7 |
| singleDot | /summarytax | 0.7 |
| singleDot | /shippingcharge | 0.7 |
| singleDot | /discount | 0.7 |
| singleDot | /subtotal | 0.7 |
| singleDot | /taxamount | 0.7 |
| singleDot | /taxhomeamount | 0.7 |
| singleDot | /nethomeamount | 0.7 |
| singleDot | /tax | 0.7 |
| singleDot | /rate | 0.7 |
| singleDot | /amount | 0.7 |
| singleDot | /accountsummaryamount | 0.7 |

FIG. 3

| Custom Form Styles | | | New ▼ |
| | | | Import Style |
| NAME | FORM TYPE | LAST EDITED ▼ | ACTION |
| Standard | All (default) | 11/13/2014 | Edit ▼ |
| My Retail Invoice | Invoice (default) | 11/13/2014 | Edit ▼ |

FIG. 7

Want to import your own style?

a  In a docx editor, like Microsoft Word, add chevrons <> around the text that QuickBooks should replace.
Download a sample b  Browse to import the DOCX file you just changed. Or, you can paste a URL.

[ Bakeryinvoice.docx ]   [ Browse ]

c  Tell QuickBooks what type of form you want to import.

[ Invoice ◆ ]

Why do this?

CHANGE THIS TEXT

Click New to choose a template, make it your own, and save it with a custom name.

From an invoice or other form, you can then

[ Next ]

[ Cancel ]

- # 100 — Reference Number
- 27-Oct-2014 — Date
- $376.16 — Amount Due
- 888, Matrock, NY, 11741 — Billing Address
- 2 — Quantity
- Chaco party with Sauce — Item Description
- $299.99 — Rate
- $599.98 — Amount
- SUBTOTAL — Company Name Next Cancel

SYSTEM AND METHOD FOR DETECTING AND MAPPING DATA FIELDS FOR FORMS IN A FINANCIAL MANAGEMENT SYSTEM

CROSS-REFERENCE TO RELATED APPLICATION

This application is a continuation application and claims priority to U.S. patent application Ser. No. 15/857,134 entitled "SYSTEM AND METHOD FOR DETECTING AND MAPPING DATA FIELDS FOR FORMS IN A FINANCIAL MANAGEMENT SYSTEM" filed on Dec. 28, 2017, now U.S. Pat. No. 11,120,512, which is a continuation-in-part application of and claims priority to U.S. patent application Ser. No. 14/697,803 entitled "SYSTEM AND METHOD FOR DETECTING AND MAPPING DATA FIELDS FOR FORMS IN A FINANCIAL MANAGEMENT SYSTEM" filed on Apr. 28, 2015 (now U.S. Pat. No. 9,934,213 B1) and is also a continuation-in-part application of and claims priority to U.S. patent application Ser. No. 14/590,286 entitled "METHOD AND SYSTEM FOR PROVIDING CUSTOMIZED FINANCIAL DOCUMENT TEMPLATES" filed on Jan. 6, 2015, all of which are assigned to the assignee hereof. The disclosures of all prior Applications are considered part of and are incorporated by reference in this Patent Application.

TECHNICAL FIELD

This disclosure relates generally to detecting and mapping data fields, and specifically to detecting and mapping data fields for forms in electronic data management systems.

BACKGROUND

Users tend to gravitate towards software programs and packages that fulfill users' needs, save time, and are easy to use. Traditional data management systems provide and utilize templates to facilitate the generation of various forms. For example, traditional financial management systems that assist users in managing financial data provide and utilize templates to facilitate the generation of financial forms such as invoices, estimates, receipts, and many more. However, traditional financial management systems are generally limited to supporting and populating form templates and form types (e.g., invoices, estimates, etc.) that are supported by the financial management system. For a user, such as a small business owner, a requirement to switch from current form templates to the form templates that are supported by the financial management system may inhibit the user from trialing or switching to a new financial management system. For example, a user may not want to switch form templates because the user may not want to inconvenience customers with invoices, estimates, and receipts of varying formats. As another example, if the user has to invest significant amounts of time to re-create templates, the user may feel trapped or obligated to use the trialed financial management system because of the amount of time that has been invested, even if the user is not completely satisfied with the service. Furthermore, varying the format of a financial form can increase the likelihood of error by both the sender and recipient of the financial form. As a result, traditional financial management systems have several shortcomings that inhibit further market growth or further acceptance of new financial management systems by some potential users. What is needed is a method and system for providing customized form templates with a financial management system to generate customized forms for a user, at least partially based on forms provided by a user, to facilitate use of a financial management system by the use.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method performed by one or more processors of a system for generating a custom document template. An example method may include retrieving a user document including a user data entry in a user data field, identifying a set of system data fields within a plurality of system documents potentially relevant to the user document, determining, for each of the set of system data fields, a weighted value indicative of a likelihood that the system data field is relevant to the user data field, identifying a most relevant system data field of the set of system data fields, the most relevant system data field having a highest weighted value of the determined weighted values, and generating a custom document template including a dynamic data region for the user data entry, the dynamic data region mapped to the most relevant system data field.

In some implementations, the method may further include identifying a set of characteristics of the user data entry, where each of the set of characteristics is indicative of at least one of a location, a function, or a content of the user data entry, and for each of the set of system data fields, determining, for each of the set of characteristics, a probability that the system data field is relevant to the characteristic, where identifying the most relevant system data field is based at least in part on the determined probabilities. In some aspects, the custom document template has a same format as the user document. In some other aspects, the plurality of system documents are native to the system and the user document is non-native to the system.

In some other implementations, the method may further include identifying the user data entry based on at least one of special characters, text enclosures, or text highlighting in the user document. In some aspects, the weighted value is determined based at least in part on a naïve Bayes' classifier. In some other aspects, the weighted value is determined based at least in part on one or more conditional probabilities.

In some implementations, the method may further include receiving the user document from a user, and providing the user with the custom document template. In some other implementations, the method may further include receiving a selected file type for the user document, and formatting the custom document template into the selected file type.

Another innovative aspect of the subject matter described in this disclosure can be implemented in a system for generating a custom document template. An example system may include one or more processors and a memory storing instructions for execution by the one or more processors. Execution of the instructions may cause the system to perform operations including retrieving a user document including a user data entry in a user data field, identifying a set of system data fields within a plurality of system documents potentially relevant to the user document, determining, for each of the set of system data fields, a weighted value indicative of a likelihood that the system data field is relevant to the user data field, identifying a most relevant system data field of the set of system data fields, the most relevant system data field having a highest weighted value of the determined weighted values, and generating a custom document template including a dynamic data region for the user data entry, the dynamic data region mapped to the most relevant system data field.

In some implementations, execution of the instructions may further cause the system to perform operations including identifying a set of characteristics of the user data entry, where each of the set of characteristics is indicative of at least one of a location, a function, or a content of the user data entry, and for each of the set of system data fields, determining, for each of the set of characteristics, a probability that the system data field is relevant to the characteristic, where identifying the most relevant system data field is based at least in part on the determined probabilities. In some aspects, the custom document template has a same format as the user document. In some other aspects, the plurality of system documents are native to the system and the user document is non-native to the system.

In some other implementations, execution of the instructions may further cause the system to perform operations including identifying the user data entry based on at least one of special characters, text enclosures, or text highlighting in the user document. In some aspects, the weighted value is determined based at least in part on a naïve Bayes' classifier. In some other aspects, the weighted value is determined based at least in part on one or more conditional probabilities.

In some implementations, execution of the instructions may further cause the system to perform operations including receiving the user document from a user, and providing the user with the custom document template. In some other implementations, execution of the instructions may further cause the system to perform operations including receiving a selected file type for the user document, and formatting the custom document template into the selected file type.

Another innovative aspect of the subject matter described in this disclosure can be implemented as a non-transitory computer-readable medium storing instructions that, when executed by one or more processors of a system for generating a custom document template, cause the system to perform operations. Example operations may include retrieving a user document including a user data entry in a user data field, identifying a set of characteristics of the user data entry, identifying a set of system data fields within a plurality of system documents potentially relevant to the user document, for each of the set of system data fields, determining, for each of the set of characteristics, a probability that the system data field is relevant to the characteristic, determining, for each of the set of system data fields, a weighted value indicative of a likelihood that the system data field is relevant to the user data field, identifying a most relevant system data field of the set of system data fields, the most relevant system data field having a highest weighted value of the determined weighted values, and generating a custom document template including a dynamic data region for the user data entry, the dynamic data region mapped to the most relevant system data field.

In some implementations, execution of the instructions may further cause the system to perform operations including identifying a set of characteristics of the user data entry, where each of the set of characteristics is indicative of at least one of a location, a function, or a content of the user data entry, and for each of the set of system data fields, determining, for each of the set of characteristics, a probability that the system data field is relevant to the characteristic, where identifying the most relevant system data field is based at least in part on the determined probabilities. In some aspects, the custom document template has a same format as the user document. In some other aspects, the plurality of system documents are native to the system and the user document is non-native to the system.

In some other implementations, execution of the instructions may further cause the system to perform operations including identifying the user data entry based on at least one of special characters, text enclosures, or text highlighting in the user document. In some aspects, the weighted value is determined based at least in part on a naïve Bayes' classifier. In some other aspects, the weighted value is determined based at least in part on one or more conditional probabilities.

In some implementations, execution of the instructions may further cause the system to perform operations including receiving the user document from a user, and providing the user with the custom document template. In some other implementations, execution of the instructions may further cause the system to perform operations including receiving a selected file type for the user document, and formatting the custom document template into the selected file type.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

The example implementations are illustrated by way of example and are not intended to be limited by the figures of the accompanying drawings. Like numbers reference like elements throughout the drawings and specification. Note that the relative dimensions of the following figures may not be drawn to scale. One skilled in the art will readily recognize that the below figures are examples and that other architectures, modes of operation, orders of operation, and elements/functions can be provided and implemented without departing from the characteristics and features of the invention, as set forth in the claims.

FIG. 3 is a block diagram of a data structure to support providing customized form templates, in accordance with one embodiment.

FIG. 7 is an example user interface for providing customized form templates with a financial management system, in accordance with one embodiment.

FIG. 8 is an example user interface for providing customized form templates with a financial management system, in accordance with one embodiment.

FIG. 9 is an example user interface for providing customized form templates with a financial management system, in accordance with one embodiment.

FIG. 10 is an example user interface for providing customized form templates with a financial management system, in accordance with one embodiment.

DETAILED DESCRIPTION

Figure 1:
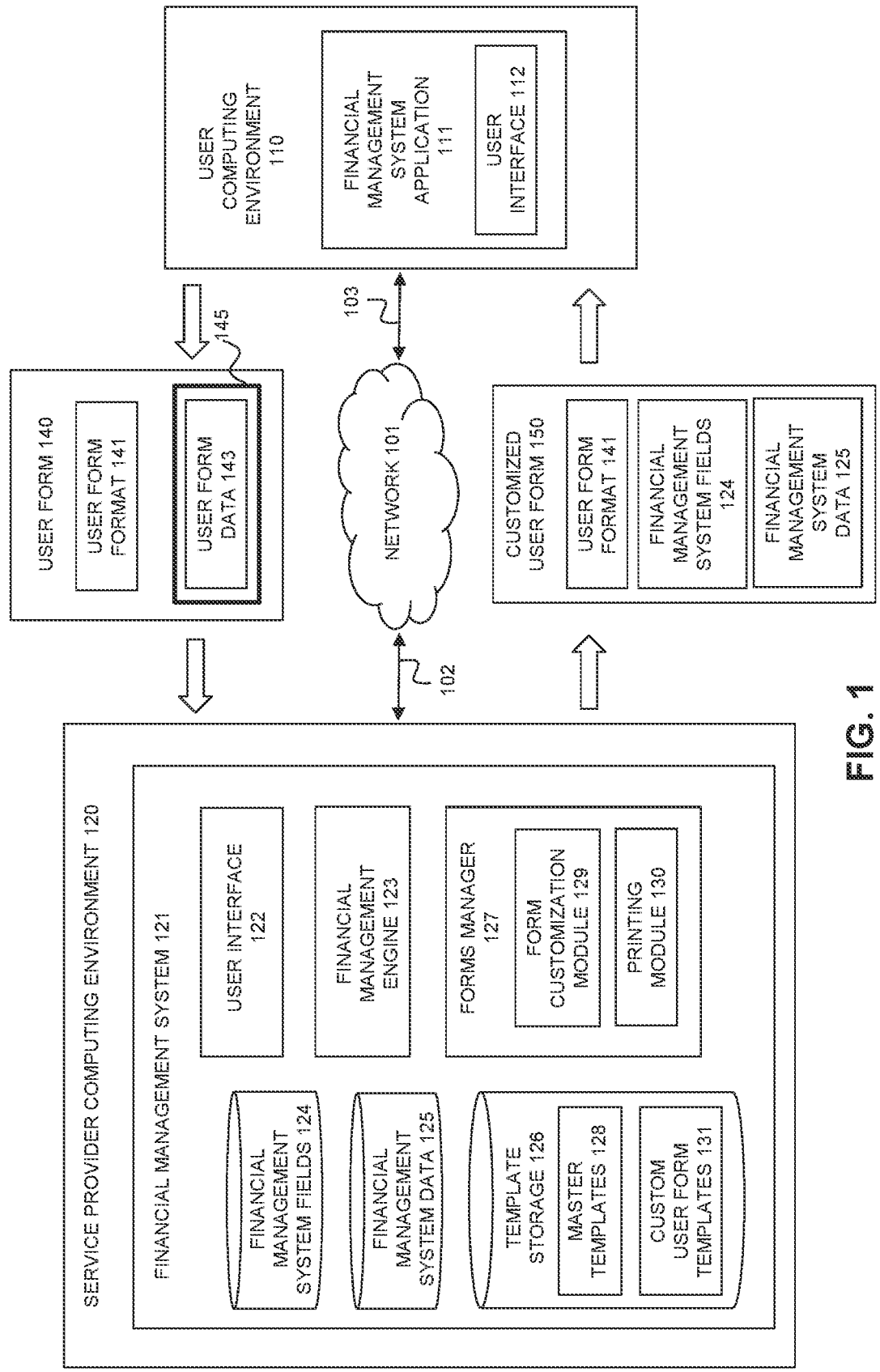
FIG. 1 is a block diagram of a hardware architecture for providing customized form templates with a financial management system, in accordance with one embodiment.

In accordance with one embodiment, the present disclosure addresses some of the shortcomings associated with traditional financial management systems by providing customized form templates with a financial management system, at least partially based on forms provided by the user, to facilitate use of a financial management system by the user, according to one embodiment. The financial management system is configured to automatically map data in a user-provided form ("user form") to data fields of the financial management system, according to one embodiment. In one embodiment, the financial management system is also configured to automatically identify the data in the user form, prior to mapping the data to data fields. The disclosed financial management system is particularly advantageous in its flexible support of non-native financial forms (e.g., forms that are not inherently provided by the financial management system), and is configured to receive, recognize, and support non-native financial forms that are provided by the user, according to one embodiment.

In some implementations, the disclosed financial management system generates customized forms for the user by receiving a user form, detecting data in the user form, mapping the data to data fields of the financial management system, and converting the user form to a custom form template that has the format of the user form and data fields associated with the financial management system, according to one embodiment. In one embodiment, the financial management system automatically detects the data in the user form prior to mapping the user form data to the data fields of the financial management system. In another embodiment, the financial management system enables the user to use alphanumeric characters and/or a graphical user interface to identify data within the user form to facilitate mapping the data to the data fields by the financial management system.

In one embodiment, the financial management system enables the user to identify data within the imported/received user form by using predetermined markers (e.g., with the inequality signs < >) or by enclosing text (e.g., with a box, a square, an oval, a circle, a free-form line, or another appropriate text enclosure) to facilitate mapping the data in the user form to the data fields of the financial management system. The financial management system is configured to recognize the identified data as portions of the user form that are to be converted to dynamic data regions for population by the financial management system, according to one embodiment. The financial management system uses features/characteristics of the data and mathematical calculations (e.g., probabilities) to map the data to the data fields of the financial management system, according to one embodiment. Using these techniques, the financial management system is advantageously able to analyze each user form individually without learning the structure of the user form and without creating a database of user forms that have been converted for use by the financial management system, according to one embodiment. The financial management system then converts the user form to a template having an editable document format (such as .doc, .docx, .pdf, .html, or .xml), and saves the converted user form as a template within the financial management system so that the financial management system can quickly apply user data to the dynamic fields of the template to support generating customized user forms, according to one embodiment.

As discussed above, there are various long-standing shortcomings associated with traditional financial management systems. Because traditional financial management systems require the use of predetermined form templates that are native to the traditional financial management system, users are required to abandon their own customized form templates, or are required to re-create existing form templates within the traditional financial management system, to receive full advantage of the features of the traditional financial management systems. In some instances, a requirement to change forms or form formats can be equated to a requirement to change the way the user and the user's customers do business. User's become accustomed to seeing information in a particular format, so changing the format can increase the likelihood of error, both by the sender and recipient of the financial form. Additionally, creating new forms can require the investment of time and effort that the user may want or need to invest elsewhere. As a result, traditional financial management systems have several shortcomings that inhibit further market growth or further acceptance by potential users.

The disclosed financial management system addresses some of the shortcomings associated with traditional tax return preparation systems by providing customized form templates with a financial management system to generate customized forms for a user, at least partially based on forms provided by the user, to facilitate use of form templates that are not native to or that are not provided by the financial management system as a default option, according to one embodiment. As a result, embodiments of the present disclosure improve the technical fields of user experience, electronic financial management systems, and data flow and distribution, by enabling financial management systems to adopt financial form formats that are presently employed by potential users of a financial management system and/or that are not native to the financial management system.

Additionally, by minimizing or reducing the amount of effort and time needed for a user to incorporate existing financial forms into a financial management system, implementation of embodiments of the present disclosure allows for significant improvement to the fields of finance management, data collection, and/or data processing. As one illustrative example, by minimizing or reducing the amount of effort and time needed for a user to incorporate existing financial forms into a financial management system, implementation of embodiments of the present disclosure enables the use of fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems. These transformed systems also advantageously enable a user the option of procuring/buying customized forms from a marketplace, since these marketplace forms may now be incorporated into the financial management system, according to one embodiment.

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, PROCESS, and USER EXPERIENCE sections herein include systems and processes suitable for providing customized form templates with a financial management system to generate customized forms for a user, at least partially based on forms provided by the user, to facilitate use of a financial management system by the user, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to: one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system," "computing device," and "computing entity," include, but are not limited to: a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party. Examples of trusted computing environments include the assets and components making up data centers associated with, and/or controlled by, an application and/or any computing systems and/or virtual assets, and/or networks of computing systems and/or virtual assets, associated with, known by, and/or controlled by, an application.

In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party. Examples of untrusted computing environments include, but are not limited to, public networks, such as the Internet, various cloud-based computing environments, and various other forms of distributed computing systems.

In various embodiments, each computing environment includes allocated assets and virtual assets associated with, and controlled or used to create, and/or deploy, and/or operate an application.

It is often the case that to create, and/or deploy, and/or operate an application, application data must be transferred between an untrusted computing environment and a trusted computing environment. However, in other situations a party may wish to transfer data between two trusted computing environments and/or two untrusted computing environments.

In various embodiments, one or more cloud computing environments are used to create, and/or deploy, and/or operate an application that can be any form of cloud computing environment, such as, but not limited to: a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource and/or virtualized part of an actual, or "bare metal" entity. In various embodiments, the virtual assets can be, but are not limited to: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

Typically, virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. Illustrative examples of such a virtual asset creation template are any of the cloud formation templates/tools provided by Amazon Web Service (AWS), Rack Space, Joyent, and/or any other of the numerous cloud based infrastructure providers.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to: any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the terms "forms" and/or "financial forms" include, but are not limited to, invoices, credit memos, sales receipts, sales orders, purchase orders, statements, estimates, and any other document that is currently used or that may be used for tracking, identifying, or otherwise managing the transfer of services and/or goods from one party to another.

Hardware Architecture

FIG. 1 illustrates a block diagram of a production environment 100 for providing customized form templates with a financial management system, at least partially based on forms provided by a user, to facilitate use of a financial management system by the user, according to one embodiment. The production environment 100 is configured to automatically identify and/or automatically map data in a user form to data fields of the financial management system, according to one embodiment. The production environment 100 is particularly advantageous in its flexible support of non-native financial forms (e.g., forms that are not inherently provided by the financial management system), and is configured to receive, recognize, and support non-native financial forms that are provided by the user, according to one embodiment. The production environment 100 generates customized forms for the user by receiving a user form, detecting data in the user form, mapping the data to data fields of the financial management system, and converting the user form to a custom form template that has the format of the user form and data fields associated with the financial management system, according to one embodiment. In one embodiment, the financial management system automatically detects the data in the user form prior to mapping the user form data to the data fields of the financial management system. In another embodiment, the financial management system enables the user to use alphanumeric characters and/or a graphical user interface to identify data within the user form to facilitate mapping the data to the data fields by the financial management system. In one embodiment, the financial management system enables the user to identify data within the imported/received user form by using predetermined markers (e.g., inequality signs < >) or by enclosing text (such as with a box, a square, an oval, a circle, a free-form line, or another appropriate text enclosure). The financial management system is configured to recognize the identified data as portions of the user form that are to be converted to dynamic data regions for population by the financial management system, according to one embodiment. The financial management system then converts the user form to a template having an editable document format (such as .doc, .docx, .pdf, .html, or .xml), and saves the converted user form as a template within the financial management system so that the financial management system can quickly apply user data to the dynamic fields of the template to support generating customized user forms, according to one embodiment.

As discussed above, there are various long standing shortcomings associated with traditional financial management systems. Because traditional financial management systems require the use of predetermined form templates that are native to the traditional financial management system, users are required to abandon their own customized form templates, or are required to re-create existing form templates within the traditional financial management system, to receive full advantage of the features of the traditional financial management systems. In some instances, a requirement to change forms or form formats can be equated to a requirement to change the way the user and the user's customers do business. User's become accustomed to seeing information in a particular format, so changing the format can increase the likelihood of error, both by the sender and the recipient of the financial form. Additionally, creating new forms can require the investment of time and effort that the user may want or need to invest elsewhere. As a result, traditional financial management systems have several shortcomings that inhibit further market growth or further acceptance by potential users.

The production environment 100 addresses some of the shortcomings associated with traditional tax return preparation systems by providing customized form templates with a financial management system to generate customized forms for a user, at least partially based on forms provided by the user, to facilitate use of form templates that are not native to or that are not provided by the financial management system as a default option, according to one embodiment. As a result, embodiments of the present disclosure improve the technical fields of user experience, electronic financial management systems, and data flow and distribution, by enabling financial management systems to adopt financial form formats that are presently employed by potential users of a financial management system and/or that are not native to the financial management system.

Additionally, by minimizing or reducing the amount of effort and time needed for a user to incorporate existing financial forms into a financial management system, implementation of embodiments of the present disclosure allows for significant improvement to the field of finance management, data collection, and data processing. As one illustrative example, by minimizing or reducing the amount of effort and time needed for a user to incorporate existing financial forms into a financial management system, implementation of embodiments of the present disclosure enables the use of fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

The production environment 100 includes a user computing environment 110 and a service provider computing environment 120 for automatically identifying and/or automatically mapping data in a user form to data fields of the financial management system, to provide customized form templates with a financial management system for a user, according to one embodiment. The computing environments 110 and 120 are communicatively coupled to each other through a network 101, with a communication channel 102, and with a communication channel 103, according to one embodiment. The user computing environment 110 transmits, uploads, or otherwise transfers a user form 140 to the service provider computing environment 120 (e.g., over the network 101), according to one embodiment. The service provider computing environment 120, transmits, downloads, or otherwise transfers a customized user form 150 to the user computing environment 110, in response to receipt of the user form 140, and at least partially based on the generation of a form template from the user form 140, according to one embodiment.

The user computing environment 110 includes one or more computing systems that are configured to transmit information to the service provider computing environment 120 and that are configured to receive information from the service provider computing environment 120 to enable a user to receive financial management services from the service provider computing environment 120, according to one embodiment. The user computing environment 110 includes a financial management system application 111, according to one embodiment. The financial management system application 111 includes a subset of financial management system features that are available from the service provider computing environment 120, according to one embodiment. For example, the financial management system application 111 includes a user interface 112 that enables a user to view, add, remove, and/or otherwise manage financial data and/or information stored by and/or within the financial management system 121, according to one embodiment. Through the user computing environment 110, the user uploads the user form 140 to enable the financial management system 121 to convert the user form 140 into a form template, and to enable the financial management system 121 to populate the generated form template with data from the financial management system 121, according to one embodiment.

The service provider computing environment 120 represents one or more computing systems such as, but not limited to, a server, a computing cabinet, and/or a distribution center that is configured to receive, execute, and host one or more financial management systems or applications for access by one or more users, e.g., the user computing environment 110, according to one embodiment. The service provider computing environment 120 is a traditional data center, a virtual asset computing environment (e.g., cloud computing environment), and/or a hybrid between a traditional data center and a virtual asset computing environment, according to one embodiment. The service provider computing environment 120 includes a financial management system 121 that is configured to automatically identify and/or automatically map data from the user form 140 to data fields of the financial management system 121, to generate the customized user form 150, at least partially based on the receipt of the user form 140, according to one embodiment. The financial management system 121 includes various components, databases, engines, modules, and data to support the automated identification and mapping of data in a user form to data fields of the financial management system, according to one embodiment. The financial management system 121 includes a user interface 122, a financial management engine 123, financial management system fields 124, financial management system data 125, template storage 126, and a forms manager 127, according to one embodiment.

The financial management system 121 employs the user interface 122 to receive the user form 140 from the user, and to provide the customized user form 150 to the user, according to one embodiment. The user interface 122 is accessible by the user computing environment 110 through a web browser or through the user interface 112 of the financial management system application 111 installed within the user computing environment 110, according to one embodiment. The user interface includes, but is not limited to, one or more dialog boxes, buttons, menus, directories, thumbnails, text boxes, radio buttons, check boxes, and other user interface elements to enable the user to interact with the financial management system 121.

The user interface 122 is configured to enable the user to upload the user form 140 and to optionally enable the user to identify data (e.g., dynamic data regions) in the user form 140 for the financial management system 121, according to one embodiment. The user interface 122 includes a page for importing custom form styles, and includes a page that enables the user to browse for a particular form (e.g., an invoice or an estimate), according to one embodiment.

The financial management system 121 executes the financial management engine 123 to receive, organize, store, and provide financial data from one or more users, according to one embodiment. The financial management engine 123 uses a number of financial management system fields 124 to categorize, order, and organize financial management system data 125, according to one embodiment. The financial management system fields 124 can be represented within the financial management system 121 as a number of different software classes, according to one embodiment. The financial management system fields 124 include, but are not limited to, one or more of a due date, an accepted date, an accounts summary date, a service date, a ship date, a date, a company name, a title, an 'accepted by' field, an item, a 'ship via' field, a company tax identification number (TIN), a business number, a tracking number, a billing tax number, a company email, a company phone, a company website, a company logo, a company address, a shipping address, a billing address, terms, a message, an item description, an account summary description, company information, an amount due in words, a quantity, a serial number, a tax rate, an amount due, a deposit, a summary tax, a shipping charge, a discount, a subtotal, a tax amount, a tax home amount, a net home amount, a tax, a rate, an amount, and an account summary amount. The financial management system fields 124 include, but are not limited to, customer name, customer billing address, customer email, customer phone, items, item description, unit price, rate, quantity, total amount, subtotal, tasks, invoice, date, invoice due date, comment, company name, company address, company phone, and company website. The financial management system fields 124 include fields that are suitable for personal finances, business finances, educational institution finances, religious institution finances, and finances of other organizations. The financial management engine 123 stores and retrieves the financial management system fields 124 in a table, chart, database, or other data structure, according to one embodiment.

The financial management system data 125 includes numeric and/or alphanumeric values that are associated with one or more of the financial management system fields 124. The financial management system data 125 includes information entered by a user or retrieved for a user, according to one embodiment. In one embodiment, the financial management system data 125 is uploaded into the financial management system 121 with a file, such as an .xml file, a .csv file, a spreadsheet file, or the like. The financial management system data 125 is associated with personal finances, business finances, or other organizational finances and is associated with one or more user accounts, according to one embodiment. The financial management engine 123 stores, organizes, and retrieves the financial management system data 125 in a table, chart, database, or other data structure, according to one embodiment. In one embodiment, the financial management system fields 124 and the financial management system data 125 are combined or included in a single database or other data structure.

The template storage 126 receives, stores, and provides templates for use by the forms manager 127, according to one embodiment. The template storage 126 includes master templates 128 that are native to the financial management system 121, e.g., are provided by the financial management system 121 as a default option for form templates, according to one embodiment. The forms manager 127 provides master templates 128 to the user through the user interface 122, in response to the request from the user for forms that are inherently, i.e., by default, provided by the financial management system 121, according to one embodiment. In other words, the financial management system 121 includes default templates for particular forms and stores the default or master templates in the template storage 126, according to one embodiment. The master templates 128 may not include the format or style of the user form 140 because the user form 140 may have been created using a system other than the financial management system 121, according to one embodiment.

The forms manager 127 is configured to use the financial management system data 125 to populate form templates, at least partially based on the financial management system fields 124 that are associated with the form templates, according to one embodiment. By populating the form templates with the financial management system data 125, the forms manager 127 enables a user to efficiently generate invoices, estimates, receipts, and other personal or business forms based on information that the user has already provided or uploaded into the financial management system 121, according to one embodiment.

The forms manager 127 includes a form customization module 129 and a printing module 130 to enable the financial management system 121 to upload the user form 140, create custom user form templates 131 from the user form 140, and generate the customized user form 150, according to one embodiment. The forms manager 127 uses the form customization module 129 to guide the user through the process of converting the user form 140 into one of the custom user form templates 131 and into the customized user form 150, by providing instructions and options to the user through the user interface 122, according to one embodiment.

The user form 140 includes a user form format 141 and user form data 143, according to one embodiment. The user form format 141 includes logos, positions of the user form data 143, font, background styles, text size, and other characteristics of the user form 140, according to one embodiment. The user form data 143 includes the information within the user form 140 that is associated with the user form format 141, such as a particular customer's name, a company's address, a company phone number, an amount of tax that is due, a date of the invoice, or the like, according to one embodiment.

The form customization module 129 includes one or more optical character recognition engines, text recognition engines, and portable document format ("PDF") conversion engines for converting and/or recognizing text in image files and PDF files and for extracting content from the user form 140, according to one embodiment. According to various implementations, the form customization module 129 (or another module in the financial management system 121) incorporates functionality from one or more open-source optical character recognition engines, e.g., FreeOCR, Tesseract, or the like. The form customization module 129 is also configured to recognize text from Word files, Open Office files, other text files, and/or other word processing documents, according to one embodiment.

The form customization module 129 identifies the user form data 143 (e.g., the dynamic data regions) based on input received from the user through the user interface 122, according to one embodiment. For example, the form customization module 139 may enable the user to create a data identifier 145 around one or more portions of the user form data 143, which the financial management system 121 may convert to dynamic data regions (e.g., regions in the user form that are to be populated by the financial management system 121 with the financial management system data 125), according to one embodiment. The data identifier 145 can include, but is not limited to, a box, a circle, an oval, text highlighting, special characters (e.g., the inequality signs or angle brackets "<" and ">"), a free-form line, or other text identification techniques used around or near the user form data 143 to enable the financial management system to identify the user form data 143 within the user form 140, according to one embodiment. The form customization module 129 causes the user interface 122 to display a page, a dialog box, a pop-up window, or an interface that includes the information that is identified by the data identifier 145, according to one embodiment. The user can mark the user form data 143 within the user form 140 either before uploading the user form 140 into the financial management system 121, or the user can mark the user form data 143 using tools provided by the financial management system 121 via the user interface 122, according to one embodiment.

Alternatively, the form customization module 129 is configured to automatically identify the user form data 143 (e.g., the dynamic data regions) within the user form 140, without the application of some kind of data identifier 145 by the user, according to one embodiment.

The form customization module 129 automates the mapping between the dynamic data regions (e.g., the user form data 143) and the financial management system fields 124 (e.g., the data fields), according to one embodiment. The form customization module 129 automates the mapping by analyzing each identified dynamic data region within the user form 140, according to one embodiment. The form customization module 129 analyzes each dynamic data region by beginning from an upper left-hand corner of the user form 140, progressing from left-to-right on the user form 140, and progressing from top-to-bottom one line at a time on the user form 140, until the bottom right-hand corner of the user form 140, according to one embodiment. In other embodiments, the form customization module 129 analyzes each dynamic data region using another pattern, sequence, or other prioritization technique.

The form customization module 129 automates the mapping between the dynamic data regions and the financial management system fields 124 by identifying/determining the characteristics of each dynamic data region, according to one embodiment. The characteristics of a dynamic data region include features that describe the location, function, and/or content of a dynamic data region, according to one embodiment. The characteristics of the dynamic data regions include, but are not limited to, a single dot ("."), multiple dots (together or separated), a slash, an at sign ("@"), a hash, an exclamation, a currency symbol, a percentage symbol, a comma, a hyphen, an open bracket, a closed bracket, a year, a month, a location within a table, an alphanumeric character length, small text, a phone number length, purely alphabetical content, purely numerical content, an alphabetic space, a numerical space, an alphanumerical content, an alphanumerical space, an alphanumerical special space, an email address format, a universal resource locator format, a data format, a telephone number format, a partial telephone number, a partial date, a plan number, an amount number, a number ID, a max date on a page, a min date on a page, a column header for a table, a location of a label, a top of the form location of a label, a bottom of the form location of a label, a left side of a form location of a label, a right side of a form location of a label, and a label format, according to one embodiment.

For each characteristic identified for a dynamic data region, the form customization module 129 evaluates a likelihood of relevance between the dynamic data region and the financial management system fields 124, according to one embodiment. In one embodiment, the form customization module 129 applies a naïve Bayes' classifier technique to the characteristics of the dynamic data regions to determine the likelihood of relevance between the dynamic data regions and the financial management system fields 124. In other embodiments, the form customization module 129 uses other statistical, mathematical, logical, or other analytical techniques for determining the likelihood of relevance between the dynamic data regions and the financial management system fields 124.

The form customization module 129 computes or stores the probability/likelihood of relevance between each characteristic and each financial management system field (e.g., each software class) that may be assigned to a dynamic data region, according to one embodiment. The form customization module 129 determines which characteristics are associated with each dynamic data region, according to one embodiment. The form customization module 129 can already have the relationship between characteristics and financial management system fields stored in the system. Therefore, when the form customization module 129 determines that a dynamic data region has a characteristic, the form customization module 129 assigns the pertinent probabilities/likelihoods of relevance (between the financial management system fields and the characteristic) to the dynamic region, according to one embodiment. In one embodiment, the form customization module 129 computes the posterior (e.g., conditional) probability of a characteristic given a financial management system field (e.g., for the class). Alternatively, the form customization module 129 computes a posterior (e.g., conditional) probability of a financial management system field (e.g., for the class) given a characteristic. Additionally, the form customization module 129 may be configured to compute the posterior conditional probability for all of the possible financial management system fields given each of the possible characteristics, according to one embodiment. Although the terms "characteristics" and "financial management system fields" are used herein, it is to be understood that "characteristics" can be referred to as "features" and "financial management system fields" can be referred to as "classes," according to one embodiment.

The financial management system 121 is configured to map the dynamic data regions and/or the characteristics of the dynamic data regions to one or more of a variety of financial management system fields 124, according to one embodiment. As mentioned above, the financial management system fields 124 can be represented within the financial management system 121 as a number of different software classes, according to one embodiment.

The form customization module 129 can use a number of techniques to determine which financial management system field is most relevant to a dynamic data region, according to one embodiment. In one implementation, the form customization module 129 sums the probabilities of each of the financial management system fields for each of the characteristics of each of the dynamic data regions. By summing the probabilities of a particular financial management system field over all of the relevant characteristics for a dynamic data region, one financial management system field should have a probability that is higher than the other financial management system fields, and the form customization module 129 maps the dynamic data region to the financial management system field having the highest cumulative probability, according to one embodiment. Once the form customization module 129 determines or increases the likelihood of relevance between a dynamic data region and a particular financial management system field, the form customization module 129 decreases the likelihood of relevance between the particular financial management system field and any other dynamic data regions, according to one embodiment. If only one dynamic data region can be assigned to a particular financial management system field, the form customization module 129 can be configured to substantially decrease the likelihood of relevance between the particular financial management system field and the other dynamic data regions, according to one embodiment. The financial management system fields (e.g., the classes) assigned to a dynamic data region are sorted from highest probability to the lowest probability, according to one embodiment.

The form customization module 129 is configured to iteratively analyze the financial management system fields that are assigned to the dynamic data regions, according to one embodiment. If the financial management system 121 analyzes the dynamic data regions from the top of the user form 140 to the bottom of the user form 140, then the opportunity exists for mapping the same financial management system field to multiple dynamic data regions. The form customization module 129 is configured to repeat the analysis of all of the dynamic data regions when a conflicting assignment or multiple assignments of a financial management system field are made to more than one dynamic data region, according to one embodiment. The form customization module 129 repeats the iteration until the conflict is resolved, according to one embodiment. Although highly unlikely, if a particular financial management system field includes the exact same probability for multiple dynamic data regions, the form customization module 129 can be configured to incorrectly assign the financial management system field to both of the dynamic data regions so that the user can correct the discrepancy, according to one embodiment.

The form customization module 129 uses the user interface 122 to display the content of the dynamic data regions (e.g., the user form data 143) with their respectively mapped financial management system fields 124, according to one embodiment. The mapped dynamic data regions (e.g., the user form data 143) and corresponding financial management system fields 124 can be reviewed and modified by the user via the user interface 122, according to one embodiment. If there is an error, the user can manually correct the error by selecting the appropriate financial management system field from, for example, a drop-down menu that lists all of the available financial management system fields 124, according to one embodiment. The form customization module 129 can be configured to maintain a corrections log, which is based at least partially on changes made by a user to the pre-populated mappings, to enable the financial management system 121 to incorporate learning and to self-improve the financial management system 121, according to one embodiment. If a financial management system field is missing from the financial management system fields 124, the form customization module 129 enables the user to add custom fields to the financial management system fields 124 through the user interface 122, according to one embodiment. By mapping the dynamic data regions (e.g., the user form data 143) to the financial management system fields 124, the financial management system 121 is enabled to automatically or manually populate the custom user form templates 131 (which are based on the user form 140) with financial management system data 125, according to one embodiment.

The forms manager 127 uses the form customization module 129 to create a custom user form template from the user form 140 that has been mapped to the financial management system fields 124, according to one embodiment. The form customization module 129 creates a custom user form template by saving the user form 140 in an editable format, according to one embodiment. The form customization module 129 saves the created custom user form template in the custom user form templates 131 for future use, according to one embodiment.

The forms manager 127 provides the custom user form templates 131 to the user as template options, through the user interface 122, to enable the financial management system 121 to generate the customized user form 150, according to one embodiment. The forms manager 127 displays selected ones of the custom user form templates 131, populates the custom user form templates 131 with financial management system data 125, and uses the printing module 130 to generate the customized user form 150 in a selected file format, according to one embodiment. The printing module 130 generates the customized user form 150 in one of a number of document formats such as, but not limited to, portable document format (".pdf"), extensible markup language (".xml"), office open XML ("OOXML"), open document format (".odt"), portable network graphics (".png"), joint photographic experts group (".jpeg"), and bitmap image file (".bmp"), according to various embodiments.

The customized user form 150 includes the user form format 141 (from the user form 140), the financial management system fields 124 that were automatically mapped and/or manually identified by the user, and the financial management system data 125 that the forms manager 127 populates into one of the custom user form templates 131, according to one embodiment.

In other embodiments, production environment 100 generates customized forms for the user by receiving a user form, enabling the user to identify fields and data in the user form, converting the user form to a custom form template, populating the fields and/or data in the custom form template based on fields and data within the financial management system, and providing the populated custom form template to the user as a customized user form, according to one embodiment. The production environment 100 enables the user to identify fields and/or data within the user form so that the financial management system of the production environment 100 may convert the fields and/or data into template objects that the financial management system populates with fields and data from the financial management system, according to one embodiment.

Figure 2:
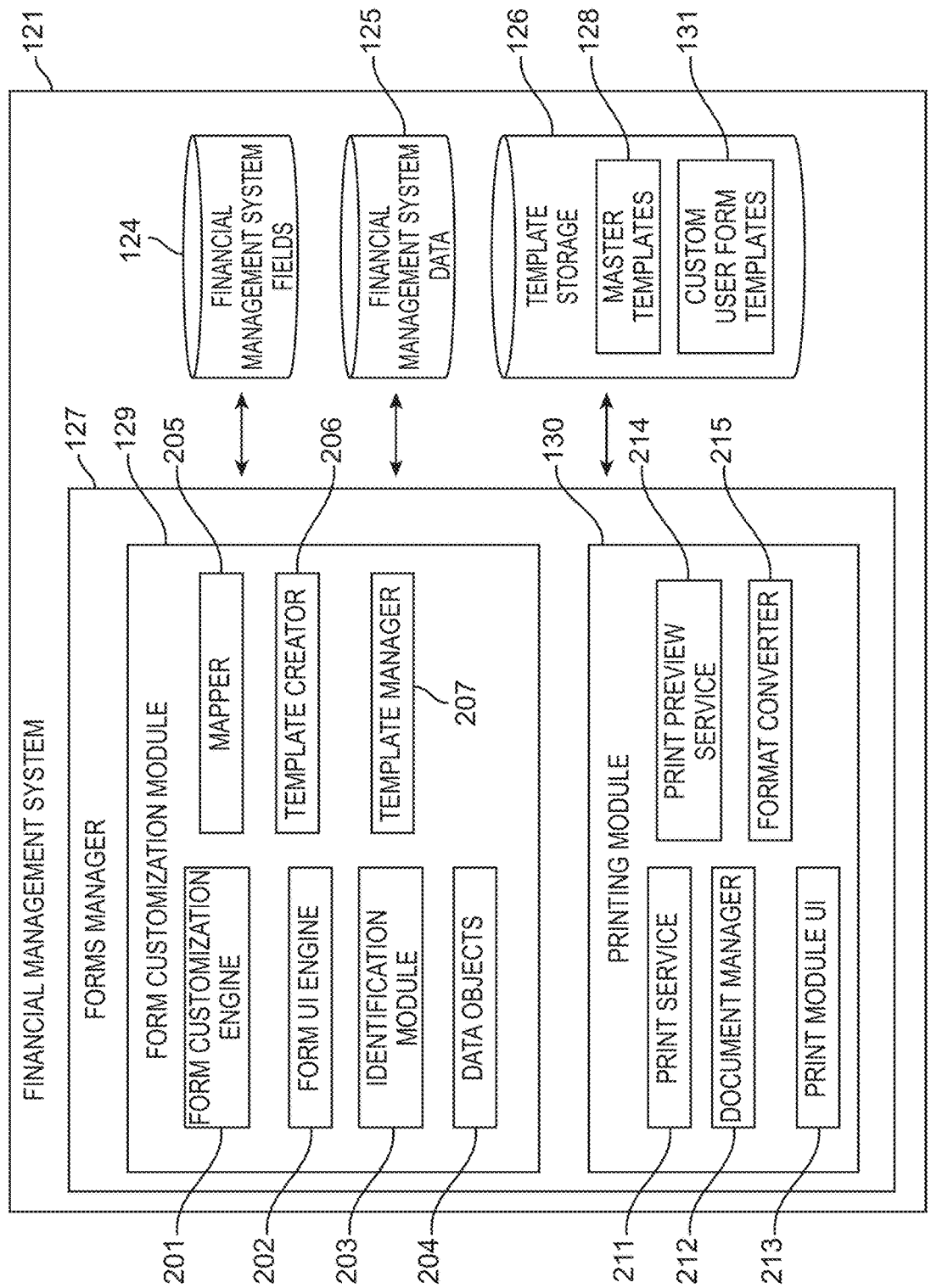
FIG. 2 is a block diagram of an example implementation of the financial management system of FIG. 1, in accordance with one embodiment.

FIG. 2 illustrates an example implementation of the forms manager 127 within the financial management system 121, according to one embodiment. The forms manager 127 is configured to use the form customization module 129 to create a custom user form template from the user form 140 and to populate the custom user form template with the financial management system data 125, according to one embodiment. The forms manager 127 is configured to use the printing module 130 to generate the customized user form 150 from the populated custom user form template, and a format specified by the user, according to one embodiment.

The form customization module 129 includes the various engines, modules, and functional components for creating a custom user form template from the user form 140 and for populating the created custom user form template, according to one embodiment. The form customization module 129 includes a form customization engine 201, a form user interface ("UI") engine 202, an identification module 203, data objects 204, a mapper 205, a template creator 206, and a template manager 207, according to one embodiment. The form customization engine 201 receives the request from the user to create a custom template, and the form customization engine 201 manages distribution of information between the functional components of the form customization module 129, according to one embodiment.

The form customization module 129 uses the form UI engine 202 (and/or the user interface 122) to communicate with the user while importing, creating, and/or populating the custom user form templates 131, according to one embodiment. For example, the form customization module 129 uses the form UI engine 202 to enable the user to upload the user form 140 into the financial management system 121, according one embodiment. The form customization module 129 also uses the form UI engine 202 to enable the user to identify the data and/or fields of the user form 140, and to enable the user to map data and/or fields of the user form 140 to the financial management system fields 124, according to one embodiment. Form customization module 129 uses the identification module 203 to provide mark-up tools to enable the user to identify data and/or fields, e.g., data objects 204, within the user form 140, according to one embodiment. The identification module 203 also includes optical character recognition engines and/or functionality to facilitate identification of data and/or fields that are marked or indicated by the user, according to one embodiment. The identification module 203 marks, identifies, and/or converts the identified data and/or fields and/or areas of the user form 140 into dynamic areas according to one embodiment. As used herein, dynamic areas refer to parts of a custom user form template that can be automatically or manually populated by the user through the financial management system 121, according to one embodiment. The data objects 204 include user fields and the user form data 143 that the user identifies with the data identifier 145 and the field identifier, respectively, according to one embodiment. The form customization module 129 employs the mapper 205 to display the identified data objects 204 along with financial management system fields 124, so that the user can pair, correlate, and/or otherwise map the identified data objects 204, e.g., the user form data 143, to the financial management system fields 124, according to one embodiment. After the data objects 204 have been mapped to one or more of the financial management system fields 124, the form customization module 129 employs the template creator 206 to save the user form 140 as one of the custom user form templates 131, according one embodiment.

The form customization module 129 enables the user to manually or automatically populate the custom user form templates 131, according one embodiment. When the user selects one of the custom user form templates 131, the template manager 207 retrieves and displays the selected custom user form template 131 for modification by the user, according to one embodiment. The financial management system 121 can be configured to automatically populate the dynamic areas of the custom user form templates 131 with the financial management system data 125, based on input received from the user, according one embodiment. In other embodiments, the financial management system 121 enables the user to manually populate the dynamic areas of the custom user form templates 131 using one or more user interface tools, such as dialog boxes, menus, text boxes, buttons, or the like.

The forms manager 127 uses the printing module 130 to format and deliver the customized user form 150, according one embodiment. The printing module 130 includes a print service 211, a document manager 212, a print module UI 213, a print preview service 214, and a format converter 215, according to one embodiment. The print service 211 uses the document manager 212 and the print module UI 213 to display available custom user form templates 131 to the user for selection, according to one embodiment. Upon selection by the user, the document manager 212 retrieves one or more of the populated custom user form templates 131, according to one embodiment. The printing module 130 uses the print preview service 214 to display a preview of the selected custom user form template 131 to the user, according to one embodiment. The printing module 130 enables the user to select a file format of the customized user form 150, according to one embodiment. The available file formats for the customized user form 150 include, but are not limited to, .pdf, .odt, .xml, .docx, .jpeg, .bmp, and .png, according to one embodiment. The printing module 130 and/or the form customization module 129 enables delivery of the customized user form 150 by email, by download, by print, by fax, or by short message service ("SMS"), according to one embodiment.

FIG. 3 illustrates a data structure 300 that includes example probabilities that can be assigned to a characteristic and a financial management system field (e.g., a class), according to one embodiment. The data structure 300 includes a characteristic 301, which may be assigned to a dynamic data region, according to one embodiment. In the illustrated example of the characteristic 301, the characteristic 301 is a single dot ("."). As disclosed above, each dynamic data region can include one or more of a variety of characteristics 301, according to one embodiment. The data structure 300 also includes a financial management system field 302, which is separated from the characteristic 301 with a "/", in the illustrated example of a data structure. As disclosed above, each characteristic can be computationally or manually assigned a probability that corresponds with each of a number of financial management system fields 302, according to one embodiment. The data structure 300 includes probabilities 303 that correspond to each pair of a characteristic 301 and a financial management system field 302, according to one embodiment. The probabilities 303 may be determined using machine learning, by analyzing existing collections of user behavior in the financial management system 121, according to one embodiment. Alternatively, the probabilities 303 may be determined or estimated manually, according to one embodiment. In one embodiment, if a probability has not been determined for a financial management system field for a characteristic, the system assigns a default value of 0.5. In one embodiment, each use of the system by a user provides additional data point with which the financial management system 121 logs and analyzes to improve the weights/probabilities assigned to the characteristics and financial management system fields.

The data structure 300 can be a table, a database, an independent file, or other data structure that is storable within the financial management system 121, according to one embodiment. The data structure 300 includes the probabilities or weight assignments (or probabilities) given to the characteristics and financial management system fields, and the financial management system 121 can alter, adjust, and/or manipulate the default weight assignments before, after, or during runtime, according to one embodiment. In another embodiment, the financial management system 121 makes a copy of a default set of weight assignments and manipulates the copy of the default set of weight assignments during runtime, according to one embodiment.

The financial management system 121 can use the data structure 300 to support multiple characters, languages, and international/worldwide use, according to one embodiment. The data structure 300 includes characteristics, financial management system fields (e.g., classes), and weight/probability assignments. The characteristics can be changed to include different languages, particular sets of alphanumeric combinations, different alphabets, and the like to support the appointment of the financial management system 121 throughout different regions of the world, according to one embodiment. Additionally, because the particular word can have different meanings in different uses (depending upon the country or language the word is used in), the data structure 300 and/or the financial management system 121 can be altered at runtime to include a particular library or dictionary of terms that are based at least partially on the language and/or regional preferences selected by a user, according to one embodiment.

Process

Figure 4:
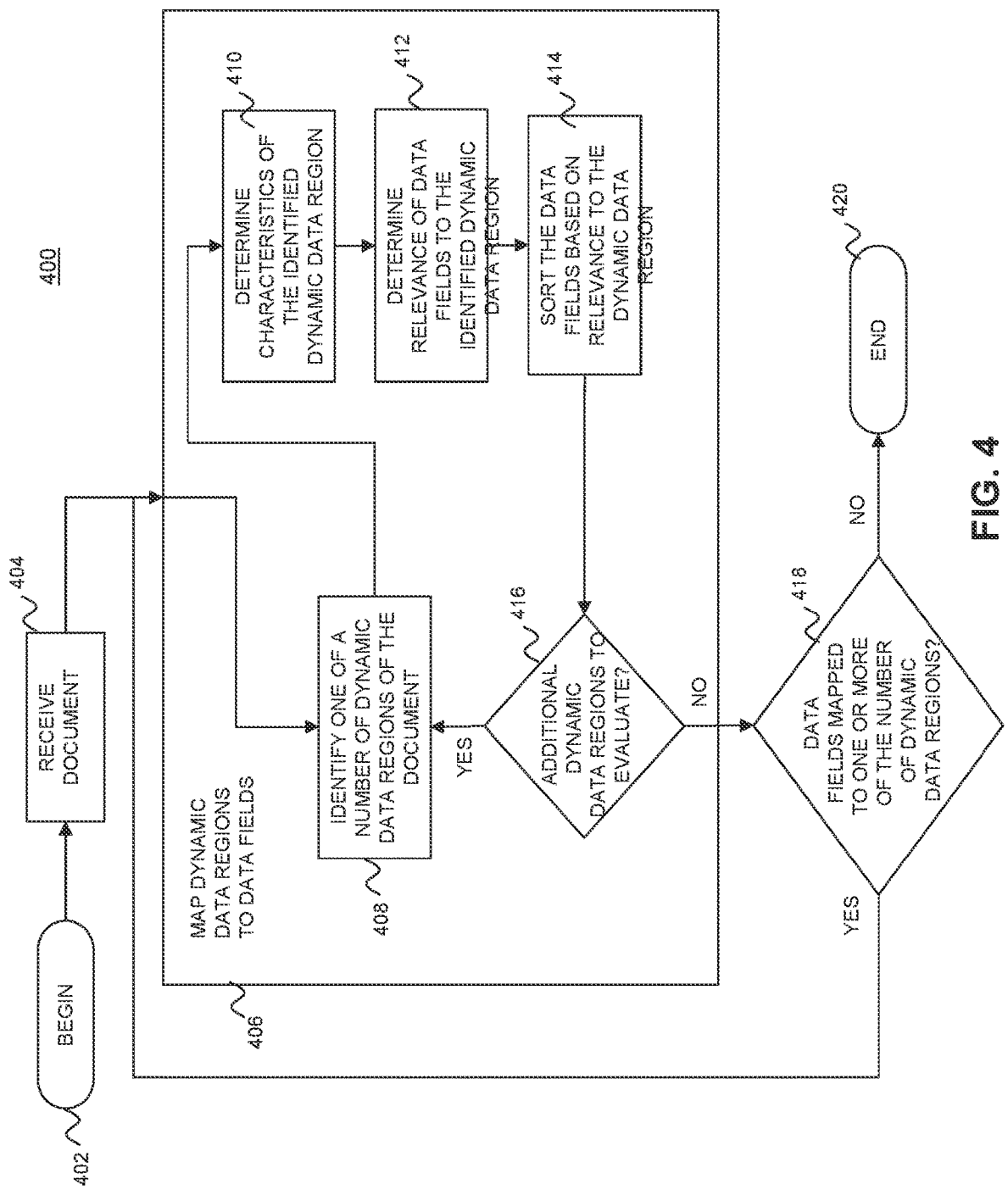
FIG. 4 is a flow diagram for providing customized form templates with a financial management system, in accordance with one embodiment.

FIG. 4 illustrates a flow diagram of a process 400 for generating customized forms with a financial management system, according to various embodiments.

At block 402, the process begins.

At block 404, the financial management system receives a document, according to one embodiment. The document is a user form, such as an invoice or receipt, having a format that is non-native to the financial management system, according to one embodiment.

At block 406, the financial management system maps dynamic data regions to data fields, according to one embodiment. The term "data fields" and "financial management system fields" are used interchangeably herein, according to one embodiment. Within the block 406, the process proceeds to sub-blocks 408-416, according to one embodiment.

At block 408, the financial management system identifies one of a number of dynamic data regions of the document, according to one embodiment. The financial management system automatically identifies/detects the dynamic data regions, according to one embodiment. The financial management system identifies/detects the dynamic data regions, at least partially based on manual marks or identifications provided in the document by a user, according to one embodiment.

At block 410, the financial management system determines characteristics of the identified dynamic data region, according to one embodiment.

At block 412, the financial management system determines the relevance of the data fields to the identified dynamic data region, according to one embodiment. The financial management system determines the relevance of the data fields to the identified dynamic data regions using posterior conditional probabilities, according to one embodiment.

At block 414, the financial management system sorts the data fields based on relevance to the dynamic data region, according to one embodiment. In other words, the data fields (e.g., classes) having the highest probability for a dynamic data region are "mapped" to that affect iteration, according to one embodiment.

At block 416, the financial management system determines if there are additional dynamic data regions to evaluate, according to one embodiment. If there are additional dynamic data regions to evaluate, the process proceeds to block 408, according to one embodiment. If there are no additional dynamic data regions to evaluate, the process proceeds to block 418, according to one embodiment.

At block 418, the financial management system determines if the data fields are mapped to more than one of the number of dynamic data regions, according to one embodiment. If the data fields are mapped to more than one of the number of dynamic data fields (such as in contradiction to a rule), the process returns to block 406 to iterate through another analysis of the dynamic data regions, according to one embodiment. If the financial management system determines that the mapping is satisfactory, the process proceeds to block 420, according to one embodiment.

At block 420, the process ends.

Figure 5:
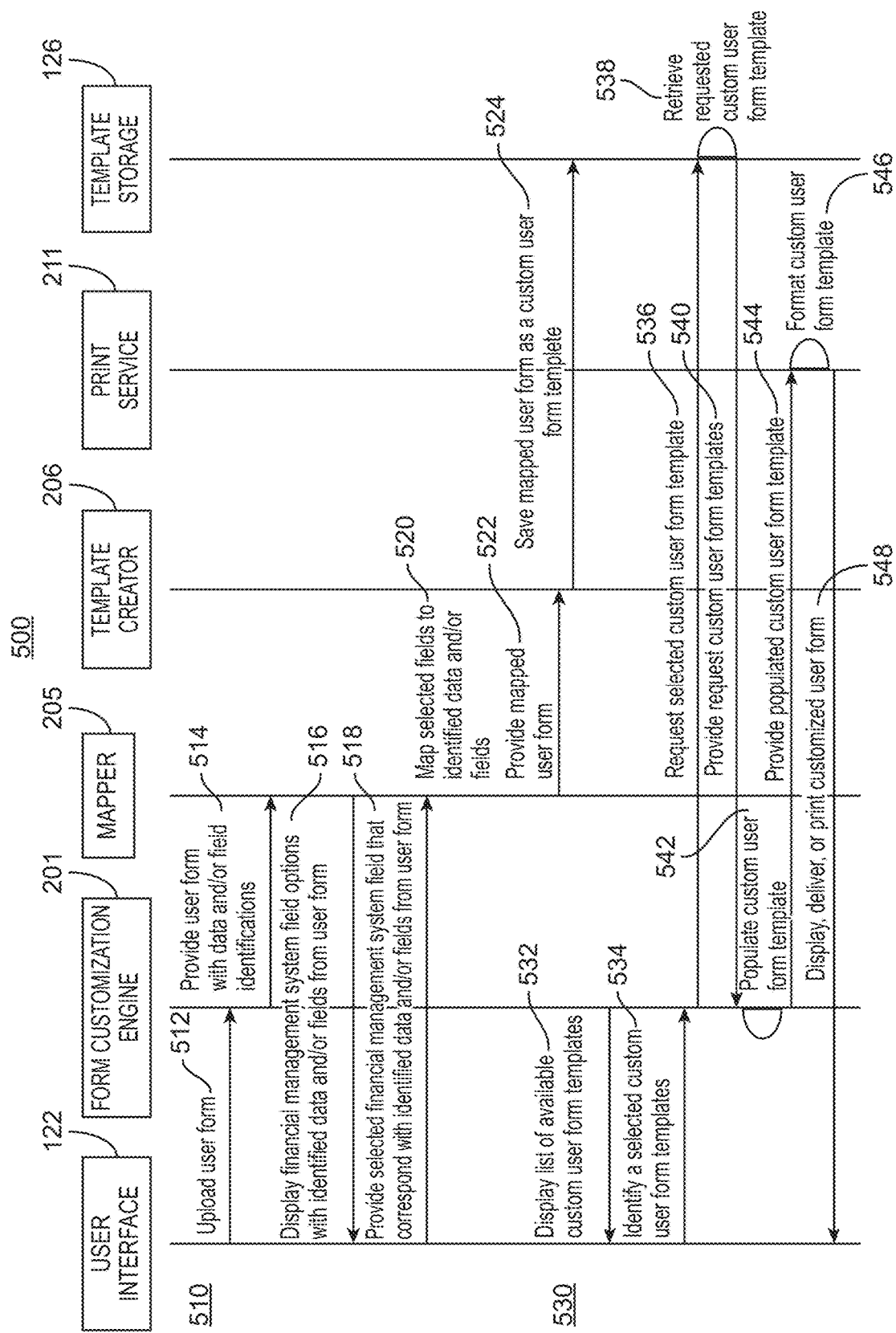
FIG. 5 is a flow diagram for providing customized form templates with a financial management system, in accordance with one embodiment.

FIG. 5 illustrates a flow diagram of a process 500 for generating customized forms with a financial management system, according to various embodiments. The process 500 for generating customized forms with a financial management system includes a sub process 510 for creating customized form templates and a sub process 530 for delivering a customized form to a user, according to one embodiment.

At block 512 of the sub process 510, the form customization engine 201 receives an uploaded user form from the user interface 122, according to one embodiment. In other implementations, another component or module within the financial management system 121 receives the uploaded user form. Along with uploading a user form, the form customization engine 201 enables the user to identify data and/or fields in the user form, to make the data and/or fields dynamic areas for population by the financial management system 121, according to one embodiment.

At block 514, the form customization engine 201 provides the user form with the data and/or field identifications to the mapper 205, according to one embodiment.

At block 516, the mapper 205 displays, with the user interface 122, financial management system field options with the identified data and/or fields from the user form, according to one embodiment.

At block 518, the user interface 122 provides selected financial management system fields that correspond with identified data and/or fields from the user form, according to one embodiment.

At block 520, the mapper 205 maps the selected fields to the identified data and/or fields of the user form, according to one embodiment.

At block 522, the mapper 205 provides the mapped user form to the template creator 206, according to one embodiment.

At block 524, the template creator 206 saves the mapped user form as a custom user form template in the template storage 126, according to one embodiment.

In some embodiments, providing (e.g., between modules or processes) a user form, a mapped user form, and/or a template includes transmitting a filename, a file path, a memory location, a file ID, or another identifier for the user form, the mapped user form, and/or the template, according to one embodiment.

At block 532 of the sub process 530, the form customization engine 201 displays a list of available custom user form templates with the user interface 122, according to one embodiment.

At block 534, the user interface 122 identifies a selected one of the custom user form templates for processing by the form customization engine 201, according to one embodiment.

At block 536, the form customization engine 201 requests the selected custom user form templates from the template storage 126, according to one embodiment.

At block 538, the template storage 126 retrieves the requested custom user form template, according to one embodiment.

At block 540, the template storage 126 provides the requested custom user form template to the form customization engine 201, according one embodiment.

At block 542, the form customization engine 201 populates the template, according to one embodiment. Populating the template can include receiving manual instructions from the user through the user interface 122, or can include executing a number of predetermined instructions that facilitate automated population of the template by the financial management system 121, according to one embodiment.

At block 544, the form customization engine 201 provides the populated custom user form template to the print service 211, according to one embodiment.

At block 546, the print service 211 formats the custom user form templates, based on a file format selection made by the user, according to one embodiment.

At block 548, the print service 211 displays, delivers, or prints the customized user form, with the user interface 122, according to one embodiment.

Figure 6:
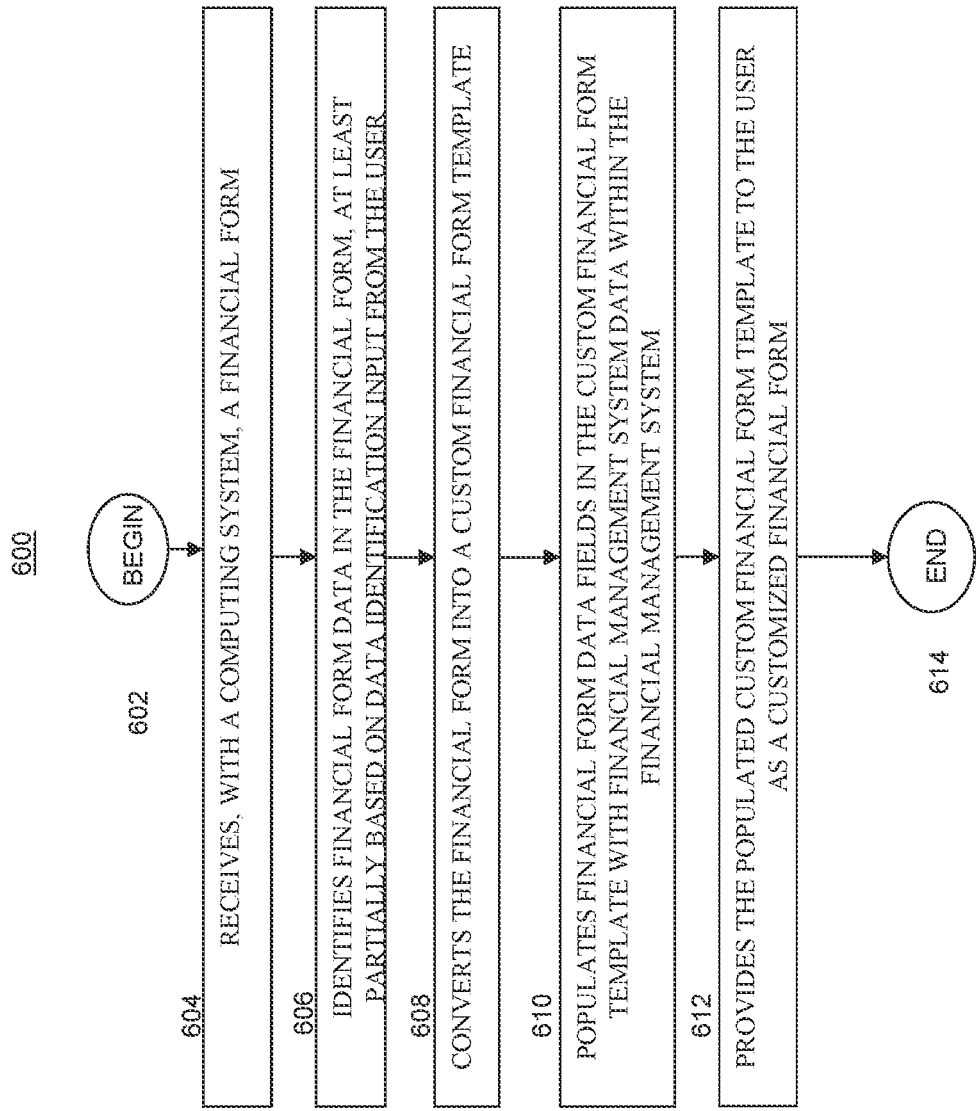
FIG. 6 is a flow diagram for providing customized form templates with a financial management system, in accordance with one embodiment.

FIG. 6 illustrates a flow diagram of a process 600 for creating customized form templates with a financial management system to generate customized forms for a user, according to various embodiments.

At block 602, the process begins.

At block 604, the process receives, with a computing system, a financial form, according to one embodiment. The financial form includes financial form data and a financial form format, according to one embodiment.

At block 606, the process identifies the financial form data in the financial form, at least partially based on data identification input from the user, according to one embodiment.

At block 608, the process converts the financial form into a custom financial form template, according to one embodiment. The custom financial form template includes the financial form format, according to one embodiment. The custom financial form template includes editable financial form data fields substituted for the financial form data identified from the data identification input from the user, according to one embodiment.

At block 610, the process populates the financial form data fields in the custom financial form template with financial management system data from the financial management system, according to one embodiment.

At block 612, the process provides the populated custom financial form template to the user as a customized financial form, according to one embodiment.

At block 614, the process ends.

User Experience

FIG. 7 illustrates a user interface 700 that is provided by the user interface 122 (of FIG. 1) to create a customized user form template, according to one embodiment. The user interface 700 includes a drop-down menu for importing/creating a new custom form style, according to one embodiment. A custom form style can include, but is not limited to, fields, data, positions of fields and data, background, images, font, font size, and the like, according to various embodiments. As illustrated, the user interface 700 displays available custom form templates from which the user may choose, for the financial management system to populate, according to one embodiment.

FIG. 8 illustrates a user interface 800 that is provided by the user interface 122 (of FIG. 1) to create a customized user form template, according to one embodiment. The user interface 800 includes instructions on how to identify data within the uploaded user form to enable the financial management system to identify dynamic fields within the user form, according to one embodiment. For example, the user interface 800 instructs a user to use special characters, e.g., "<" and ">", around the text that the financial management system should replace, according to one embodiment. The user interface 800 also includes one or more text boxes and browse features to enable the user to select a document, e.g., a Word document or .pdf document, to upload into the financial management system, from which to create a custom user form template, according to one embodiment. The user interface 800 also includes one or more menus that enable the user to select the type of financial form the user is uploading into the financial management system, according to one embodiment.

FIG. 9 illustrates a user interface 900 that is provided by the user interface 122 (of FIG. 1) to graphically illustrate the mapping performed by the financial management system, based on the characteristics of the content of the uploaded user form, according to one embodiment. The user interface 900 displays the content of the dynamic data regions 901 that the financial management system mapped to financial management system fields 902, according to one embodiment. The mapped financial management system fields 902 are presented in a menu to enable the user to correct any fields that were incorrectly mapped to the user form data (e.g., the dynamic data regions). The menu 903 is configured to present a list of financial management system fields that are ranked from highest probability to lowest probability of mapping to the content of the dynamic data region 901, so that the user can quickly and easily find the fields with the next highest likelihood of matching the content of the dynamic data region 901, according to one embodiment.

Figure 10:
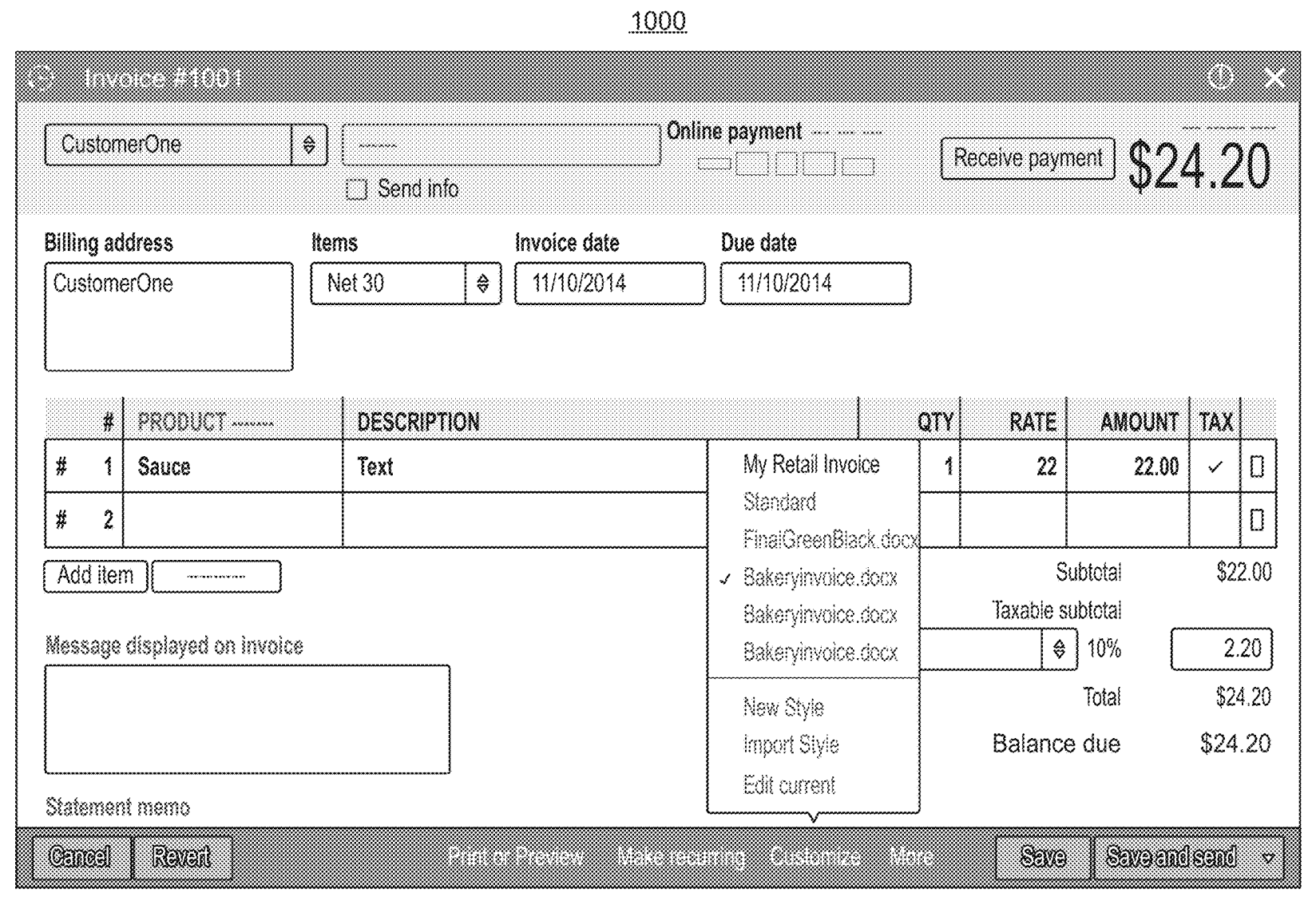

FIG. 10 illustrates a user interface 1000 that is provided by the user interface 122 (of FIG. 1) to create a customized user form template, according to one embodiment. The user interface 1000 displays the fields, the data, and/or the format of the customized user form, as mapped and populated within the financial management system, according to one embodiment. The user interface 1000 includes, but is not limited to, print menus, template selection buttons, save buttons, send buttons, text boxes, and various other fields and data associated with a customized user form, e.g., the customized user form 150 (of FIG. 1), according to one embodiment.

As noted above, the specific illustrative examples discussed above are but illustrative examples of implementations of embodiments of the method or process for creating customized form templates with a financial management system to generate customized forms for a user. Those of skill in the art will readily recognize that other implementations and embodiments are possible. Therefore, the discussion above should not be construed as a limitation on the claims provided below.

In accordance with an embodiment, a computing system implemented method generates a customized financial document template in a financial management system. The method includes receiving, with a financial management system on a computing system, a financial document, and the financial document includes a plurality of data entries, according to one embodiment. The method includes identifying the plurality of data entries in the financial document, according to one embodiment. The method includes mapping the plurality of data entries to a plurality of data fields of the financial management system, according to one embodiment. Mapping includes identifying characteristics of each of the plurality of data entries, assigning a relevance weight to each of the characteristics for each of the plurality of data fields, and determining a relevance of the plurality of the data fields to the plurality of the data entries, at least partially based on the characteristics of the plurality of data entries, according to one embodiment. The method includes populating a custom financial document template with financial management system data from the financial management system, at least partially based on the mapping of the plurality of data entries to the plurality of data fields, to replace the plurality of data entries with the financial management system data, according to one embodiment. The method includes providing the custom financial document template to a user as a customized financial document, according to one embodiment.

In accordance with an embodiment a computer-readable medium has a plurality of computer-executable instructions which, when executed by a processor, perform a method for generating customized document templates with a financial management system. The instructions include a user interface module configured to receive a financial document from a user, and the financial document includes a plurality of data entries, according to one embodiment. The instructions include a document customization module configured to map the plurality of data entries to a plurality of data fields of a financial management system, according to one embodiment. The document customization module identifies characteristics of each of the plurality of data entries, according to one embodiment. The document customization module applies relevance weights to the plurality of data entries at least partially based on the characteristics of the plurality of data entries, according to one embodiment. The relevance weights represent a likelihood of co-existence of each of a plurality of data fields and each of the characteristics, according to one embodiment. The instructions include a forms manager to populate a custom document template with financial management system data, to replace the plurality of data entries, at least partially based on the map of the plurality of data entries to the plurality of the data fields, according to one embodiment.

In accordance with an embodiment, a system for generates a customized financial document template in a financial management system. The system includes at least one processor, and at least one memory coupled to the at least one processor, according to one embodiment. The at least one memory stores instructions which, when executed by any set of the one or more processors, perform a process for generating a customized financial document template in a financial management system, according to one embodiment. The process includes receiving, with a financial management system on a computing system, a financial document, and the financial document includes a plurality of data entries, according to one embodiment. The process includes identifying the plurality of data entries in the financial document, according to one embodiment. The process includes mapping the plurality of data entries to a plurality of data fields of the financial management system, according to one embodiment. Mapping includes identifying characteristics of each of the plurality of data entries, assigning a relevance weight to each of the characteristics for each of the plurality of data fields, and determining a relevance of the plurality of the data fields to the plurality of the data entries, at least partially based on the characteristics of the plurality of data entries, according to one embodiment. The process includes populating a custom financial document template with financial management system data from the financial management system, at least partially based on the mapping of the plurality of data entries to the plurality of data fields, to replace the plurality of data entries with the financial management system data, according to one embodiment. The process includes providing the custom financial document template to a user as a customized financial document, according to one embodiment.

The disclosed financial management system addresses some of the shortcomings associated with traditional tax return preparation systems by providing customized form templates with a financial management system to generate customized forms for a user, at least partially based on forms provided by a user, to facilitate use of form templates that are not native to or that are not provided by the financial management system as a default option, according to one embodiment. As a result, embodiments of the present disclosure improve the technical fields of user experience, electronic financial management systems, and data flow and distribution, by enabling financial management systems to adopt financial form formats that are presently employed by potential users of a financial management system and/or that are not native to the financial management system.

Additionally, by minimizing or reducing the amount of effort and time needed for a user to incorporate existing financial forms into a financial management system, implementation of embodiments of the present disclosure allows for significant improvement to the field of finance management, data collection, and data processing. As one illustrative example, by minimizing or reducing the amount of effort and time needed for a user to incorporate existing financial forms into a financial management system, implementation of embodiments of the present disclosure enables the use of fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems. These transformed systems also advantageously enable a user the option of procuring/buying customized forms from a marketplace, since these marketplace forms may now be incorporated into the financial management system, according to one embodiment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method performed by one or more processors of a system for generating a custom document template, the method comprising:
receiving, from a user interface of a web browser or a software application executing on a computing system associated with a user, a user document including a user data entry in a user data field;
identifying a set of system data fields within a plurality of system documents potentially relevant to the user document;
determining, for each of the set of system data fields, a weighted value indicative of a likelihood that the system data field is relevant to the user data field;
identifying a most relevant system data field of the set of system data fields, the most relevant system data field having a highest weighted value of the determined weighted values;
generating a custom document template including a dynamic data region for the user data entry, the dynamic data region mapped to the most relevant system data field; and
transmitting the custom document template over a communications network to the computing system associated with the user.

2. The method of claim 1, further comprising:
identifying a set of characteristics of the user data entry, wherein each of the set of characteristics is indicative of at least one of a location, a function, or a content of the user data entry; and
for each of the set of system data fields, determining, for each of the set of characteristics, a probability that the system data field is relevant to the characteristic, wherein identifying the most relevant system data field is based at least in part on the determined probabilities.

3. The method of claim 1, wherein the custom document template has a same format as the user document.

4. The method of claim 1, wherein the plurality of system documents are native to the system and the user document is non-native to the system.

5. The method of claim 1, further comprising:
identifying the user data entry based on at least one of special characters, text enclosures, or text highlighting in the user document.

6. The method of claim 1, wherein the weighted value is determined based at least in part on a naïve Bayes' classifier.

7. The method of claim 1, wherein the weighted value is determined based at least in part on one or more conditional probabilities.

8. The method of claim 1, further comprising:
receiving the user document from a user; and
providing the user with the custom document template.

9. The method of claim 1, further comprising:
receiving a selected file type for the user document; and
formatting the custom document template into the selected file type.

10. A system for generating a custom document template, the system comprising:
one or more processors; and
at least one memory coupled to the one or more processors and storing instructions that, when executed by the one or more processors, cause the system to perform operations including:
receiving, from a user interface of a web browser or a software application executing on a computing system associated with a user, a user document including a user data entry in a user data field;
identifying a set of system data fields within a plurality of system documents potentially relevant to the user document;
determining, for each of the set of system data fields, a weighted value indicative of a likelihood that the system data field is relevant to the user data field;
identifying a most relevant system data field of the set of system data fields, the most relevant system data field having a highest weighted value of the determined weighted values;
generating a custom document template including a dynamic data region for the user data entry, the dynamic data region mapped to the most relevant system data field; and
transmitting the custom document template over a communications network to the computing system associated with the user.

11. The system of claim 10, wherein execution of the instructions causes the system to perform operations further including:
identifying a set of characteristics of the user data entry, wherein each of the set of characteristics is indicative of at least one of a location, a function, or a content of the user data entry; and
for each of the set of system data fields, determining, for each of the set of characteristics, a probability that the system data field is relevant to the characteristic, wherein identifying the most relevant system data field is based at least in part on the determined probabilities.

12. The system of claim 10, wherein the custom document template has a same format as the user document.

13. The system of claim 10, wherein the plurality of system documents are native to the system and the user document is non-native to the system.

14. The system of claim 10, wherein execution of the instructions causes the system to perform operations further including:
identifying the user data entry based on at least one of special characters, text enclosures, or text highlighting in the user document.

15. The system of claim 10, wherein the weighted value is determined based at least in part on a naïve Bayes' classifier.

16. The system of claim 10, wherein the weighted value is determined based at least in part on one or more conditional probabilities.

17. The system of claim 10, wherein execution of the instructions causes the system to perform operations further including:
- receiving the user document from a user; and
- providing the user with the custom document template.

18. The system of claim 10, wherein execution of the instructions causes the system to perform operations further including:
- receiving a selected file type for the user document; and
- formatting the custom document template into the selected file type.

19. A non-transitory computer-readable medium storing instructions that, when executed by one or more processors of a system for generating a custom document template, cause the system to perform operations including:
- receiving, from a user interface of a web browser or a software application executing on a computing system associated with a user, a user document including a user data entry in a user data field;
- identifying a set of characteristics of the user data entry;
- identifying a set of system data fields within a plurality of system documents potentially relevant to the user document;
- for each of the set of system data fields, determining, for each of the set of characteristics, a probability that the system data field is relevant to the characteristic;
- determining, for each of the set of system data fields, a weighted value indicative of a likelihood that the system data field is relevant to the user data field;
- identifying a most relevant system data field of the set of system data fields, the most relevant system data field having a highest weighted value of the determined weighted values;
- generating a custom document template including a dynamic data region for the user data entry, the dynamic data region mapped to the most relevant system data field; and
- transmitting the custom document template over a communications network to the computing system associated with the user.

20. The computer-readable medium of claim 19, wherein execution of the instructions causes the system to perform operations further including:
- receiving the user document from a user;
- receiving a selected file type for the user document;
- formatting the custom document template into the selected file type; and
- providing the user with the custom document template.

* * * * *